United States Patent [19]

Deprez et al.

[11] 4,318,648
[45] Mar. 9, 1982

[54] GEAR GENERATING MACHINE

[75] Inventors: Thomas A. Deprez, Rochester; Philip F. White, Victor, both of N.Y.

[73] Assignee: The Gleason Works

[21] Appl. No.: 138,037

[22] Filed: Apr. 7, 1980

[51] Int. Cl.³ .............................. B23F 5/22; B23F 5/28
[52] U.S. Cl. ........................................ 409/11; 409/14; 409/17; 409/59; 51/95 GH
[58] Field of Search ....................... 409/10, 11, 14, 17, 409/22, 23, 59; 51/95 GH

[56] References Cited

U.S. PATENT DOCUMENTS

| | | |
|---|---|---|
| 1,469,602 | 10/1923 | Perkins et al. . |
| 2,360,235 | 10/1944 | Jellis ................................. 51/95 GH |
| 2,481,974 | 9/1949 | Bradner . |
| 2,483,810 | 10/1949 | Cotta . |
| 2,484,856 | 10/1949 | Purvin . |
| 2,516,750 | 7/1950 | Brower . |
| 2,537,967 | 1/1951 | Carlin . |
| 2,629,290 | 2/1953 | Staples et al. . |
| 2,690,701 | 10/1954 | Zimmermann et al. . |
| 2,697,382 | 12/1954 | Petrie . |
| 2,700,324 | 1/1955 | Staples et al. . |
| 2,714,838 | 8/1955 | Scone . |
| 2,769,375 | 11/1956 | Moncrieff . |
| 2,773,427 | 12/1956 | Barish . |
| 2,839,968 | 6/1958 | Moncrieff . |
| 2,906,178 | 9/1959 | Cotta . |
| 3,096,686 | 7/1963 | Davenport et al. . |
| 3,301,134 | 1/1967 | Daniel . |
| 3,342,106 | 9/1967 | Batorski et al. . |
| 4,082,031 | 4/1978 | Hodgson . |
| 4,215,959 | 8/1980 | Deprez ................................. 409/10 |

Primary Examiner—Z. R. Bilinsky
Attorney, Agent, or Firm—Morton A. Polster; Ralph E. Harper

[57] ABSTRACT

In a machine of the type in which cutting tools are arranged on successive links of an endless chain, each tool being in offset rotation to the preceding tool, at right angles to the direction of travel, means are provided for periodically shifting the workhead and work spindle parallel with the plane in which the tools travel when cutting. The means for shifting are operatively independent of the means for driving the chain and the work spindle in generation, and are operated when the tools and workpieces are disengaged, and normally after a predetermined number of stacks of workpieces has been cut, in order to equalize wear on the blades carried by the chain.

8 Claims, 7 Drawing Figures

GEAR GENERATING MACHINE

BACKGROUND AND BRIEF DESCRIPTION OF INVENTION

This invention is an improvement on a gear generating machine for cutting spur and helical gears and other toothed elements, and more particularly wherein the machine comprises an endless chain of cutting tools.

Such a machine is disclosed in U.S. Pat. No. 1,469,602. A recent invention comprising improvements making a machine of the endless chain type capable of cutting gear teeth by intermittent indexing methods as well as by the continuous indexing method, is disclosed in co-pending application Ser. No. 929,600, filed July 31, 1978.

In machines of a more conventional type which employ rotating hobbing cutters, particularly of the cylindrical type, as contrasted with machines of the type disclosed herein employing the endless chain cutter, it is well known to add life to cutting tools by adjusting the hob relative to successive workpieces by shifting the hob axially a controlled amount every so many workpieces cut. It is also known in such hobbing machines to provide a mechanism for producing the periodic shift automatically. Such mechanisms are disclosed, for example in U.S. Pat Nos. 2,481,974, 2,697,382 and 4,082,031. It is also known to effect the axial shift of the hob as a continuous motion during cutting, and an example of such an apparatus will be found in U.S. Pat. No. 2,537,967. The shifting is done so as to better distribute the wear over the full face of the hob.

In the chain-generating machine of the present invention, the tools of the chain travel in a flat plane in the cutting zone, and the endless chain of cutters provides, in effect, a cutter of infinite diameter, having many times more cutting edges than a conventional hob. Generally, a stack of several workpieces is cut in a single operation, and all the workpieces in the stack are engaged simultaneously by the chain cutter, there being no feed motion axially of the workpiece.

The machine has great inherent advantages over a hobbing machine, and to obtain the maximum advantages available in productivity, quality of finish, and tool life, it is necessary to make a shift of the chain cutter relative to the work. That is, in order to realize the ultimate obtainable gains, it is necessary to manage the distribution of the wear on all the available cutting edges of the chain cutter, as it is necessary to do in a conventional hobbing machine in order to obtain the best economy available with that type machine. This part of the problem is much the same, in that a periodic relative shift of cutter and work in the direction corresponding to the hob axial direction in a conventional hobber, is needed.

As noted above, in hobbing machines, the shifting to properly distribute wear is done by moving the hob along its axis. Various mechanisms are employed to accomplish the shift automatically. For example, in the mechanism disclosed in U.S. Pat. No. 2,481,974, at the end of the hobbing cycle a reversible motor rotates a worm wheel-rachet combination which locks and unlocks and actuates a screw and nut thrust means to advance the hob arbor and the hob a predetermined amount along the hob axis.

In another hob shifting arrangement, disclosed in U.S. Pat. No. 2,697,382, automatic hydraulic controls reversibly actuate a piston which is integral with a wide faced helical gear. The helical gear engages a rack fixed to a hob slide operable in the axial direction of the hob. As the piston is actuated in one direction, the piston-gear serves to advance the rack and the hob through a small predetermined distance.

In U.S. Pat. No. 4,082,031 a hob slide, for moving a hob in its axial direction, is moved incrementally by a screw and nut means rotated, through gearing, by a stepping motor.

Although the chain cutter employed in the continuous indexing operation has a basic similarity to a hob, a problem exists which does not present itself in the conventional hobbing machines. Due to the chain drive system, the size and weight of the chain cutter and its supporting structure, and the heavy cutting loads, considerations of accuracy and rigidity make it impractical to provide for a shift movement of the chain.

However, the invention as described herein, obtains the necessary relative movement by means of a mechanism which provides for intermittent movement of the work spindle laterally in a plane parallel to the plane in which the tools travel while cutting. Since there is a component of this shifting movement which is at right angles to the direction of the chain travel, there is thus provided a relative cutter and work displacement which is comparable to the axial shift of the hob in the conventional hobber.

In this way, increased tool life is obtained without shifting the chain support and, therefore, without interfering with the rigidity of the chain drive system and of the support structure, which are vital to machine accuracy.

The machine and the apparatus of the invention will be further described with reference to the accompanying drawings.

DETAILED DESCRIPTION OF INVENTION

Figure 1:
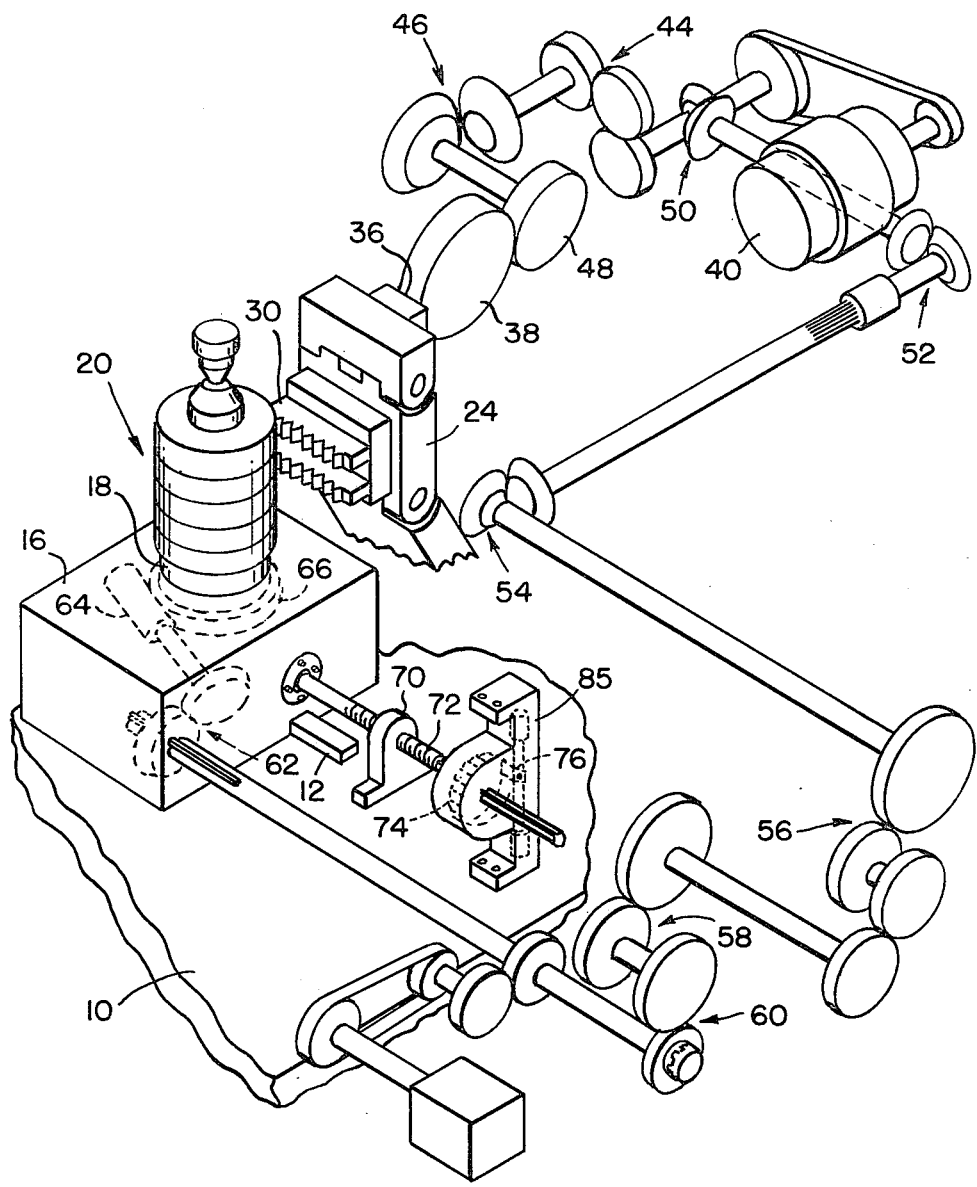
FIG. 1 is an isometric schematic layout of the drive system of the machine and showing the improvement of the invention.
Figure 2:
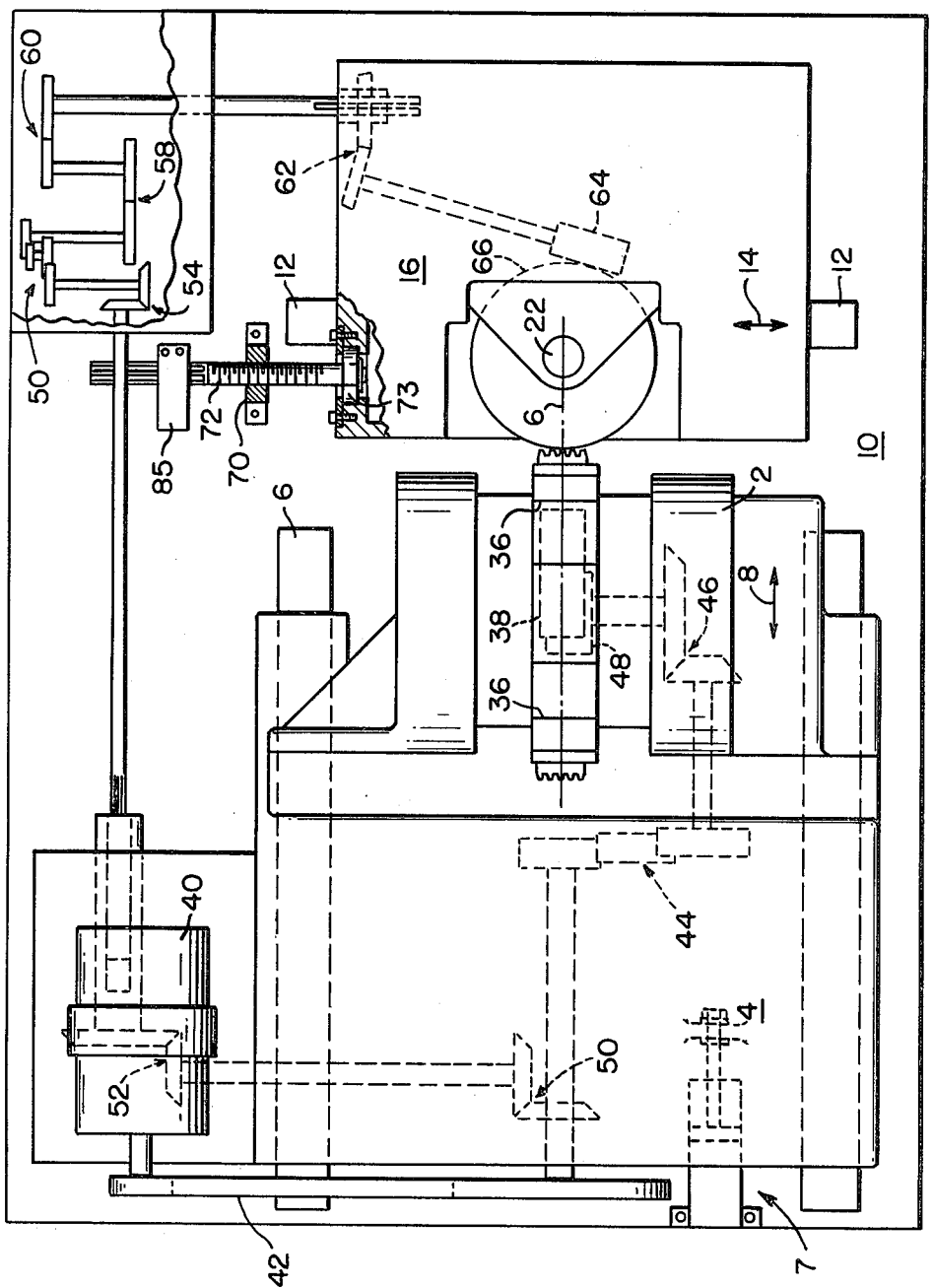
FIG. 2 is a schematic plan view of the machine, also showing the improvement of the invention.
Figure 3:
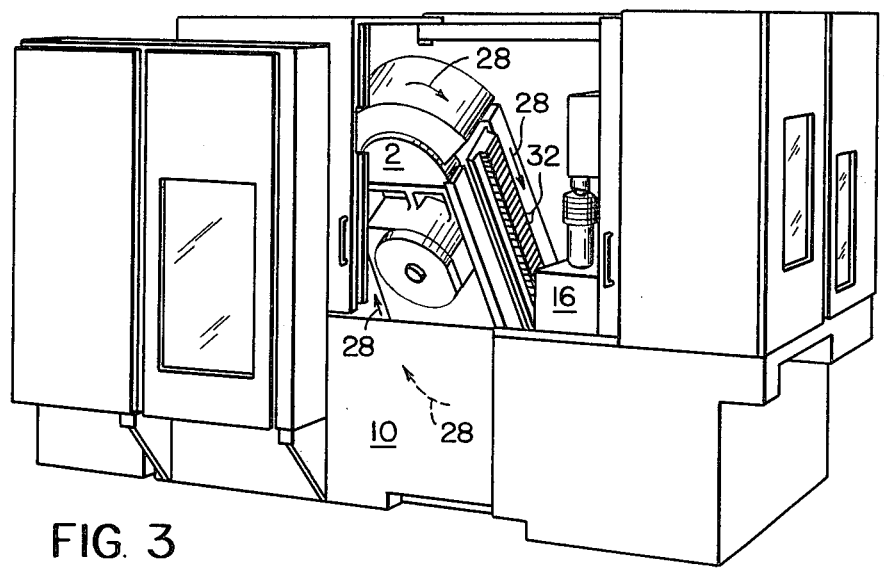
FIG. 3 is a perspective view of the front of the machine, showing the chain cutter.

With reference to FIGS. 1, 2 and 3, the machine comprises a chain housing 2 angularly adjustable on a chain support 4 for making a helix angle setting dependent upon the lead angle of the chain cutter and the helix angle of the work. The chain support in turn is mounted on ways 6 for movement by hydraulic means 7, to and from working engagement with workpieces, in the direction of arrow 8 on the machine base 10. Mounted on slide way 12 for movement in the direction of arrow 14 is a workhead 16, the workhead supporting a work spindle 18 and a workpiece or workpieces 20 for rotation on axis 22.

Figure 4:
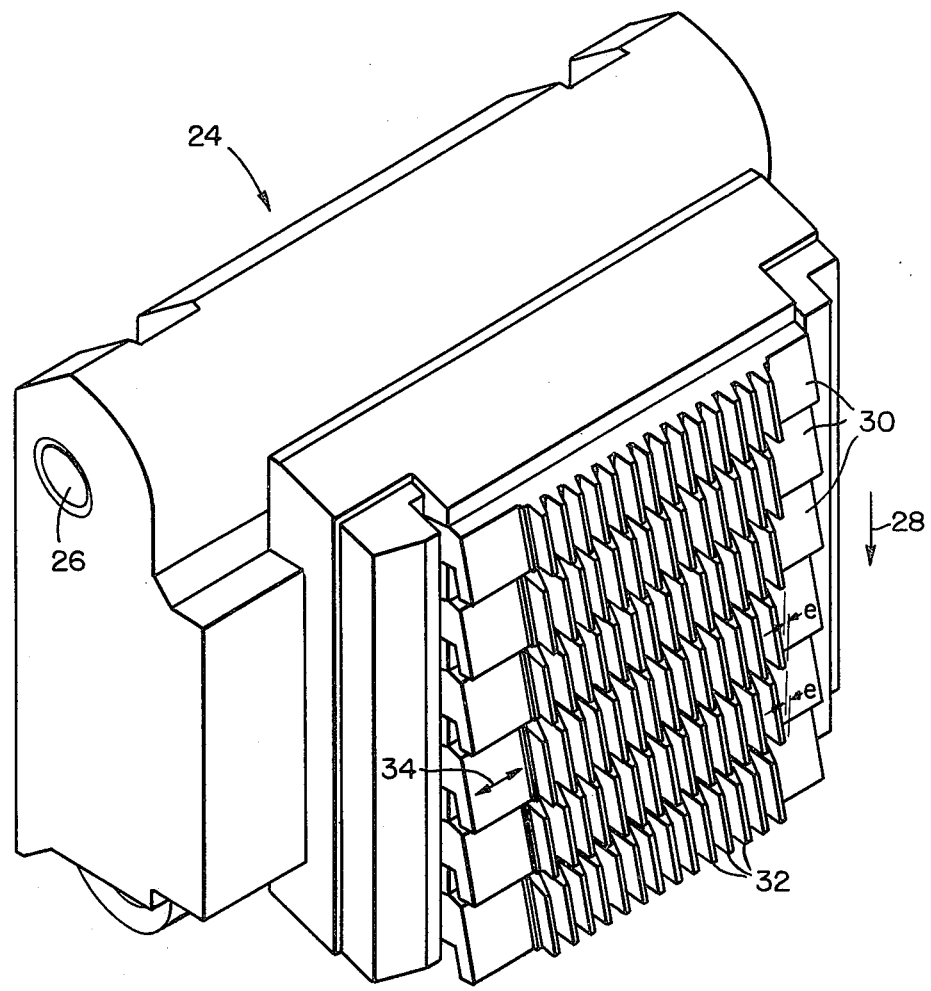
FIG. 4 is an isometric view of a single link of the chain showing the tools carried thereby.

The chain cutter comprises a chain of links 24, one of which is shown in FIG. 4, the links being pivotally connected together on pins 216. The endless chain travels on rollers (not shown) which support the chain for travel in the direction of arrow 28 on chain housing 2. To each link are attached a series of multiple toothed cutting tools 30, each tool forming a rack having multiple teeth 32. Each rack tool 30 is offset laterally by a distance e relative to the preceding tool of the link in the direction of arrow 34 so as to produce a chain of tools having certain important characteristics of a conventional cylindrical hob having several convolutions. If the chain of cutters is arranged in the manner of a single thread hob and so that the rack tools have cutting faces which are all equally spaced about the chain, the distance e will be equal to the pitch of the racks divided by the number of racks. If the arrangement is in the manner of a hob having two starts or two threads, distance e will be equal to the pitch divided by half the number of racks. The tools travel in straight lines in a plane while cutting, and in contrast to a hobber, there is no feed movement axially of the work spindle, only the cutting motion provided by the rotation of the endless chain, in addition to the rotation of the work pieces. It is usual to cut a stack of several workpieces at once, and the rack tools are usually several teeth in width as shown, for cutting helical gears.

The chain is driven by means of rack teeth 36 (FIG. 1) on the back of each link, each link enaging in turn with gear 38, the latter gear being rotated by means of drive motor 40 through belt and pulley 42 and gear sets 44, 46 and gear 48.

Connecting the drive to the chain with the work spindle for timed rotation of chain and work spindle are gear drives 50, 52, 54, 56, 58, 60, 62 and worm and worm wheel, 64 and 66 respectively.

Figure 5:
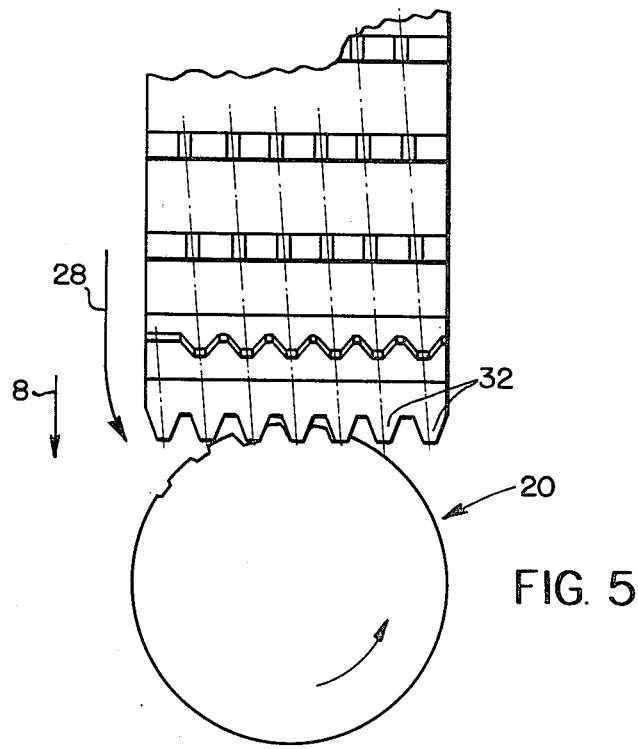
FIG. 5 is a schematic view showing tool and work engagement and offset of tools.

In usual operation, the chain and work spindle are rotated in timed relation based on the number of starts in the chain cutter and the number of teeth in the workpiece, and a depth feed motion is provided by moving the chain support 4 on ways 6 toward the work spindle in the direction of arrow 8 (FIG. 5) until full cutting depth is reached, following which the rotation of chain cutter and work spindle is continued for at least one full revolution, so that all the teeth in the workpiece are completely generated at full depth. After at least a full revolution of the work spindle is made with chain cutter and work engaged at full tooth depth, the cutter is withdrawn by reversing the movement of the chain support 4 on the ways 6, and the rotation is stopped. There are such a large number of rack tools comprised in the chain that with ordinary materials and ordinary numbers of teeth and tooth depths in the workpieces, such as in automotive gears, full depth is attained in only a fraction of a turn of the workpieces, such as $\frac{2}{3}$ turns, and the complete cutting operation requires only one and a fraction turns of the work spindle after the chain cutter first enters engagement with the workpiece. As above noted, it is the usual practice to cut a stack of several identical workpieces in a single operation.

In order to equalize wear on the blades carried by the chain, after a predetermined number of stacks of workpieces has been cut, the novel mechanism disclosed herein effects a relative shift of chain cutter and work spindle when tools and workpieces are disengaged, in such a way as to produce a component of relative displacement in the direction corresponding to the axial direction of a hob. According to the invention, this is accomplished by using means operatively independent of the chain and work spindle drive, to effect a lateral displacement of the work spindle in a direction parallel with the plane of tool travel and at an angle to the direction of the tool travel.

In accordance with the preferred embodiment of the invention, the work head 16 is moved perpendicular to the work spindle 18 on a slide way 12 on the machine base. There is also provided a nut 70 and a screw 72, one of which and in this case the screw, is rotatably mounted in and axially constrained relative to the workhead 16, by means of bearing 73, and the other of which, and in this case the nut, is fixedly mounted to the machine base 10. There is an indexing driven element, which in the described embodiment is a ratchet wheel 74 which is mounted for rotation with and axially slidable relative to the screw for the purpose of incrementally rotating the screw. The engaging ratchet pawl is a pusher pawl 76 biased by means of spring 78 toward the wheel 74 and pivotally mounted on pin 84 to a movable member in the form of a piston 80, movable tangentially of the ratchet wheel in cylinder 82. The wheel, pawl and piston-cylinder apparatus are contained in a ratchet housing 85.

Figure 6:
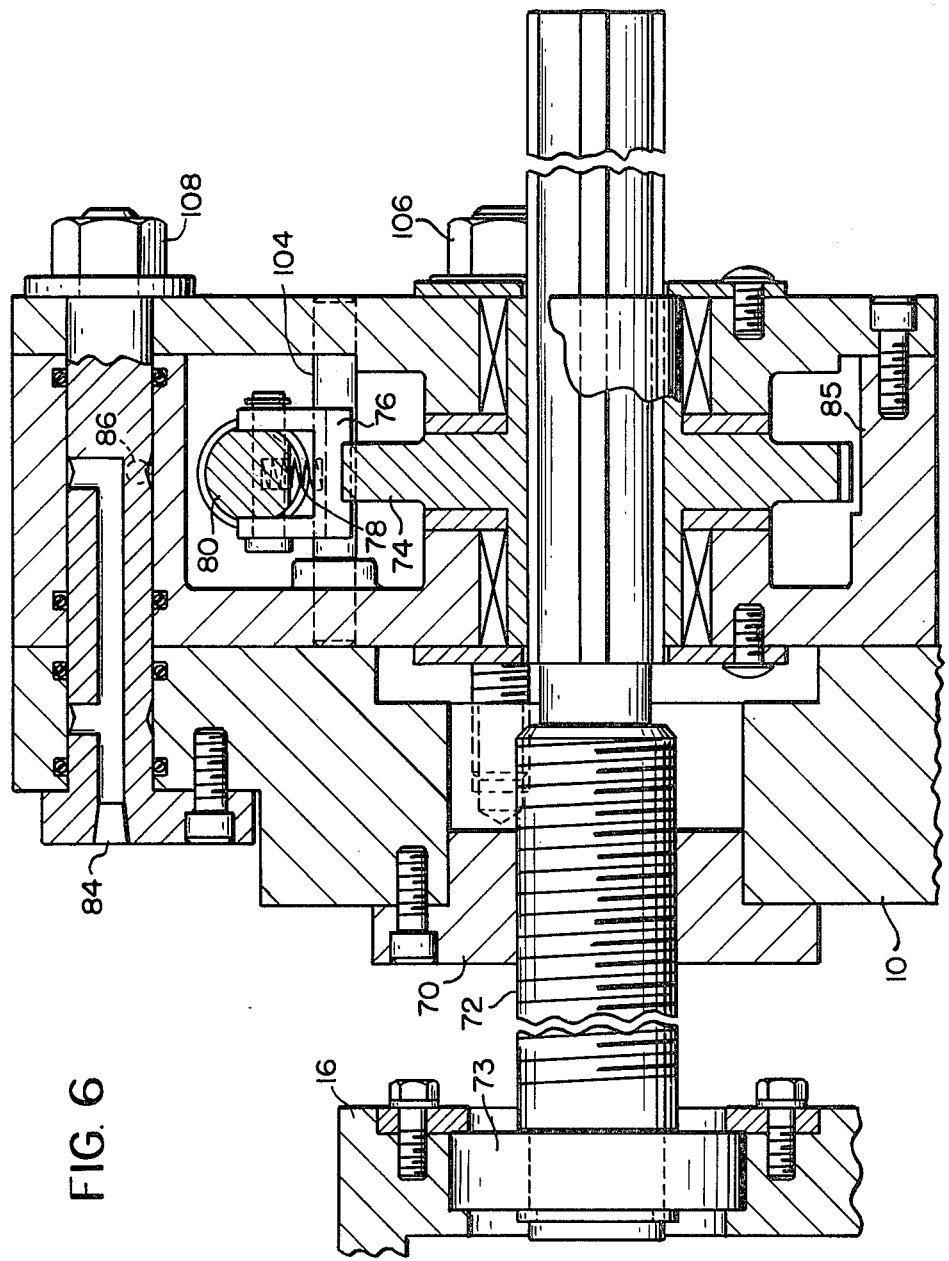
FIG. 6 is a plan view in section, of the shift mechanism showing the ratchet wheel and pawl and the screw member of the nut and screw means.
Figure 7:
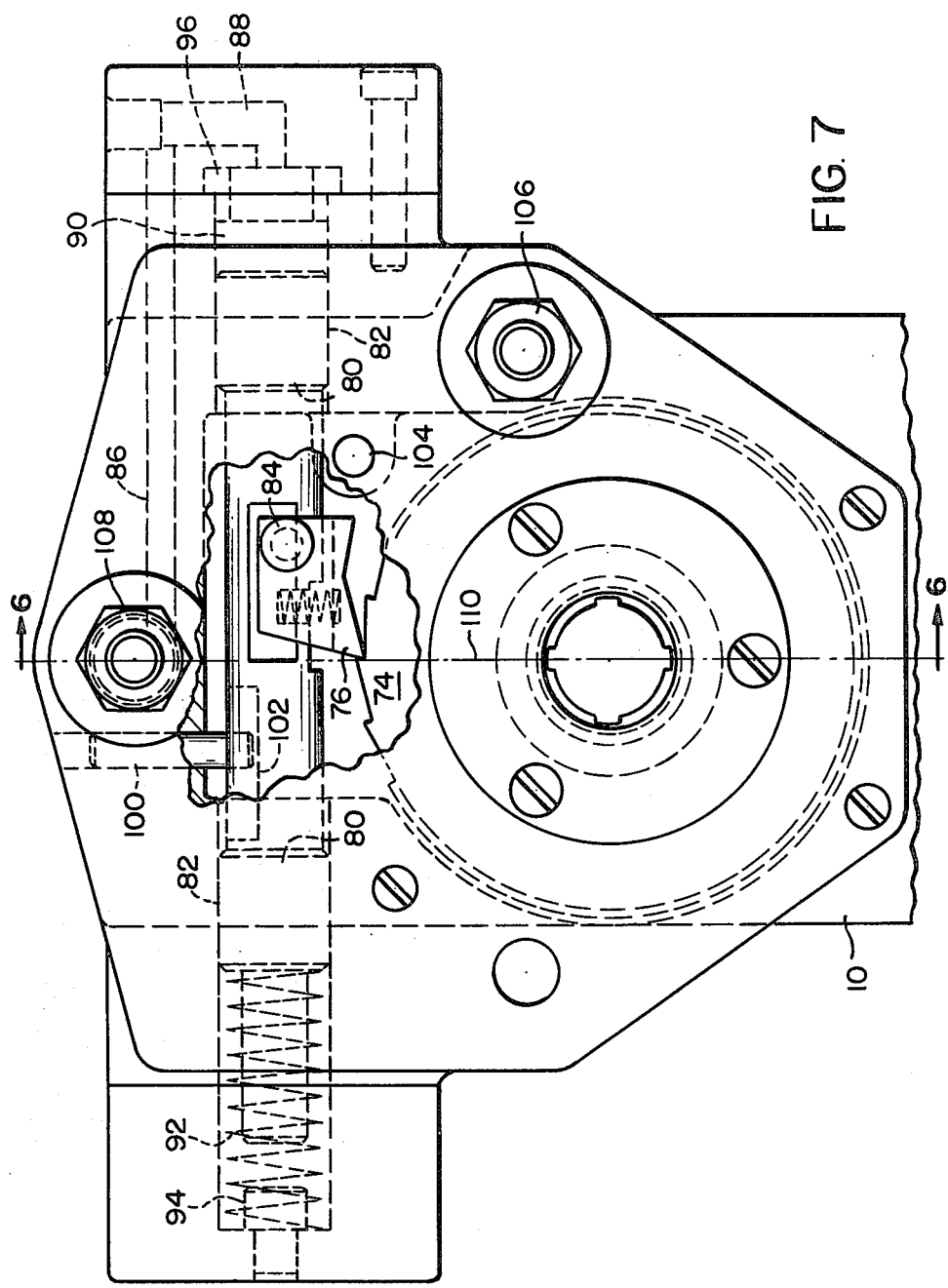
FIG. 7 is an end elevation view of the shift mechanism in which can be seen the ratchet wheel and pawl and the movable member.

The piston is pressured upward in FIG. 7 by hydraulic fluid admitted through line 84, 86, 88 (FIGS. 6 and 7) to chamber 90, and against the pressure of return spring 92. The travel of the piston is controlled by piston extension 98 abutting an index stop 94 and lower end of the piston abutting reset stop 96. The pitch of the ratchet wheels and the thicknesses of the stops can be varied to regulate the angle of advance of the wheel for each shift. Also, if necessary the machine controls can be regulated so that the piston is actuated more than one time for each shift of the workhead. The pin 100 slidably engages the piston in keyway 102 to prevent piston rotation.

Pin 104 is engaged by the pawl on each return stroke to lift the pawl clear of the wheel to permit rotating the wheel and screw by hand, if desired. Such hand rotation may be used to return the work head to its starting position after shifting has taken place over the full range of the chain cutter.

Also operable in timed relation with the shifter mechanism are clamps (not shown) for clamping and unclamping the work head to the machine base.

If it is desirable to make the shifts of the workhead in the opposite direction, the piston and the ratchet wheel can simply be inverted on the screw, by removing nuts 106, 108 in FIGS. 6 and 7, or vertical fastening means as in FIG. 1, and rotating the entire housing 180 degrees on axis 110.

In FIGS. 1 and 2 the drive arrangement of the machine and also the special apparatus of the invention are shown schematically, and it is pointed out that the external configuration of the nut 70 and the ratchet housing 85, and the means indicated for fastening each to base 10 differ slightly from that shown in FIGS. 6 and 7, although functionally they are the same, the difference being for convenience of illustration only.

What is claimed is:

1. In a machine for cutting gears and other toothed workpieces, and of the type in which a series of cutting tools are arranged on successive links of an endless chain, each tool being in offset relation to the preceding tool of the chain, at right angles to the direction of travel, said chain being arranged with a straight portion such that the tools travel substantially in a plane when cutting, and in which there is also provided a machine base, a rotatable work spindle, for carrying one or more workpieces, mounted in a workhead and having a rotational axis parallel to the plane of tool travel, means for relatively angularly adjusting the chain and the work spindle for making a helix angle setting, means for driving said endless chain and said work spindle in timed relationship, and means for effecting relative movement of the chain and the work spindle to bring tools and workpieces to and from working engagement, the improvement in said machine comprising automatic shifting means, operatively independent of said driving means, for effecting unidirectional intermittent lateral movement of said workhead and work spindle when the tools and workpieces are disengaged, said movement being parallel with said plane of tool travel and at an angle to the direction of said travel.

2. The improvement as in claim 1 wherein said automatic shifting means comprises slide way means mounting said workhead for said lateral movement on said base, nut and screw means, one of which is rotatably mounted in and axially constrained relative to said workhead, and the other of which is fixedly mounted to said machine base, an indexing means comprising a rotatable means mounted for rotation with said one of said nut and screw means, for incrementally rotating said one means.

3. The improvement as in claim 2 in which there is an indexing driver element adapted for engagement with said rotatable means.

4. The improvement as in claim 3 in which said rotatable means and said index driver element are respectively a ratchet wheel and a ratchet pusher pawl engagable therewith, the pawl being mounted on a movable member, and means for intermittantly moving said movable member back and forth through a controlled distance producing unidirectional relative movement of the nut and the screw so as to effect said intermittent lateral movement of the workhead and work spindle.

5. The improvement as in claim 2, wherein said one of said nut and screw means is axially slidable in said indexing means, and wherein the indexing means is constrained against axial movement relative to said base.

6. The improvement as in claim 4, where said movable member is a hydraulic piston movable rectilinearly in a cylinder, and said pusher pawl is pivotal relative to the piston.

7. The improvement as in claim 4 where said ratchet wheel, said ratchet pawl and said movable member are invertable as a unit, relative to said nut and screw means to permit reversal of the direction of said intemittent lateral movement.

8. The improvement as in claim 4 wherein adjustable stop means are provided for controlling the distance travelled by the piston.

* * * * *